(12) United States Patent
Bachorik et al.

(10) Patent No.: US 11,620,206 B2
(45) Date of Patent: Apr. 4, 2023

(54) MONITORING SYSTEM FOR SAMPLING EXCEPTION DATA WITH A CONTROLLED DATA RATE

(71) Applicant: Datadog, Inc., New York, NY (US)

(72) Inventors: Jaroslav Bachorik, Jenec (CZ); Marcus Hirt, Küssnacht (CH); Nikolay Martynov, Oakville (CA)

(73) Assignee: Datadog, Inc., New York, NY (US)

( * ) Notice: Subject to any disclaimer, the term of this patent is extended or adjusted under 35 U.S.C. 154(b) by 85 days.

(21) Appl. No.: 17/238,036

(22) Filed: Apr. 22, 2021

(65) Prior Publication Data
US 2022/0342790 A1   Oct. 27, 2022

(51) Int. Cl.
*G06F 11/34* (2006.01)
*G06F 11/30* (2006.01)

(52) U.S. Cl.
CPC ........ *G06F 11/3428* (2013.01); *G06F 11/302* (2013.01)

(58) Field of Classification Search
CPC .......................... G06F 11/302; G06F 11/3428
USPC ....................................................... 702/186
See application file for complete search history.

(56) References Cited

U.S. PATENT DOCUMENTS

| | | | | | |
|---|---|---|---|---|---|
| 5,758,168 | A | * | 5/1998 | Mealey | G06F 11/3466 714/E11.2 |
| 5,790,846 | A | * | 8/1998 | Mealey | G06F 11/3466 714/E11.2 |
| 5,963,737 | A | * | 10/1999 | Mealey | G06F 9/32 714/E11.2 |
| 11,436,123 | B2 | * | 9/2022 | Kleiner | G06F 11/3495 |
| 2019/0052575 | A1 | * | 2/2019 | Kaminski | H04L 43/0817 |
| 2021/0406149 | A1 | * | 12/2021 | Kleiner | G06F 11/3419 |

* cited by examiner

*Primary Examiner* — John H Le
(74) *Attorney, Agent, or Firm* — Fish & Richardson P.C.

(57) ABSTRACT

Monitoring a performance of one or more computing systems includes configuring, by at least one processor, a sampling window for sampling exceptions data generated by at least one application instance being executed by a computing device, the exceptions data indicating an occurrence of at least one operation performed by the application instance. Configuring the sampling window comprises determining a number of exceptions generated for a prior sampling window, determining a computing bandwidth that is available for monitoring the exceptions, and controlling a sampling rate of the sampling window based on the number of exceptions and the computing bandwidth. The monitoring includes receiving, during the sampling window, the exceptions data generated by the at least one application instance, sampling, based on the sampling rate, the exceptions data, and generating, based on the sampling, summary data representing the exceptions data.

20 Claims, 10 Drawing Sheets

MONITORING SYSTEM FOR SAMPLING EXCEPTION DATA WITH A CONTROLLED DATA RATE

TECHNICAL FIELD

The disclosure relates to performance monitoring of applications executing on computing systems.

BACKGROUND

During execution of an application, an application exception can be generated by the application for reporting how the application is executing. The application exception can include information such as a stack trace that illustrates how the application has executed. In some examples, the exception can used for reporting errors or causing the application to perform an operation in response to a particular exception being reported. Some applications, in high-scale scenarios, are configured to generate many (e.g., hundreds of thousands) of exceptions per second. This can occur when exceptions are used for controlling the execution flow. The execution flow can include a series of operations performed by the application. Controlling the execution flow includes specifying which operations are performed and/or how subsequent operations are performed.

SUMMARY

This disclosure describes a monitoring system for one or more computing systems that are configured for executing respective instances of an application. The monitoring system is configured to monitor performance of the one or more computing systems using a controlled (e.g., constant or nearly constant) data rate. The monitoring system controls a data overhead used for monitoring the one or more computing systems so as not to exceed a threshold level of computing resources available in the computing system including the monitoring system. Generally, even during periods of high activity, the monitoring system is configured to accurately summarize a performance of the one or more computing systems while controlling the bandwidth used for monitoring below a threshold level.

The one or more computing systems can include client systems distributed over a computing network, each executing one or more instances of the application. The monitoring system generally includes a data processing system configured to communicate with the client systems on the network. The monitoring system is configured to monitor application exceptions of the application for the instances. Generally, the data of exceptions are generated by the one or more instances of the application during execution of the one or more instances of the application. The exceptions generally includes exceptions data such as a stack trace that illustrates how the application is executing. The exceptions can include one or more different types, such as those indicative of different errors or operations occurring from the one or more application instances. The exceptions can each include a stack trace showing a series of operations or actions performed by the application that caused the exception to occur.

The monitoring system is configured to generate a profile of the exceptions. Generating a profile can include generating summary data representing the exceptions. The summary generally includes a representation of the exceptions without including all the data of the application exceptions. For example, the profile can include a statistical summary of the exceptions and additional data that together provide a representation of exceptions that are being generated by the one or more application instances. In an example, the additional data can include metadata associated with the exceptions data or portions of the exceptions data. The summary data does not require including an entire stack trace of each exception, or even part of the data from each exception. Rather, the summary data are generated from a sample of the data of the exceptions. The monitoring system uses sample data sampled from the exceptions data to generate the representation of the exceptions being generated by the one or more application instances.

The monitoring system is configured to select samples of the exceptions data so that the monitoring system generates a representation of the exceptions data that is accurate. For example, the monitoring system selects samples of the exceptions to so that the monitoring system monitoring system can determine how many exceptions of each type are being generated by the one or more application instances. The monitoring system is configured to sample the exceptions data to determine where, during execution of the one or more instances of the applications, the exceptions are being generated. More specifically, the monitoring system is configured to determine what the state of a given application instance is when the exception is generated by that application instance.

The monitoring system is configured to sample the exception data by using an adjustable sampling frequency. The monitoring system spaces the samples approximately evenly over time, even as a production rate (e.g., occurrence) of exceptions generated by the one or more instances of the applications fluctuates. The monitoring system takes samples at a given frequency during a sampling window with represents a period of time for monitoring the one or more application instances. The monitoring system re-computes a sampling rate (e.g., a number of samples taken per exceptions generated) associated with a next sampling window. For example, the sampling rate can be adjusted to maintain a desired sampling overhead bandwidth under a limit for an overall length of time (e.g. a day, an hour, a minute, etc.). The sampling rate is determined based on the sample data obtained from at least one previous sampling window. For example, if a number of exceptions received is increased, the monitoring system decreases a rate of the sampling for the next sampling window. In some implementations, a sampling interval for a given window is computed based on an exponential moving average of the incoming data rate over last N windows Implementations of the subject matter described herein can provide various technical benefits. Some applications generate a large number (e.g., hundreds of thousands) of exceptions per second per instance or for a group of instances across a networked system of distributed clients. A large number of exceptions can result from an application being configured for using exceptions to control a program flow (e.g. operations during execution) of the application. Monitoring exceptions to control program flow uses a relatively large amount of computing bandwidth because each exception object is generated and populated with a full stack trace (e.g., up to 1024 frames). The stack trace shows a list of actions by the application that cause the exception to be generated. Directly recording events for exceptions being generated by an application can be unstable when a large numbers of exceptions are generated. This is because computing bandwidth limits are overwhelmed. Computing bandwidth refers to the available processing of the system that is available to perform processing operations, and can be measured in computing cycles (e.g., processing time) or a similar metric. In other words, the data produced in the exceptions is simply too much to be ingested and dealt with by a managing data processing system as the exceptions are generated. The overhead of recording each stack trace hundreds of thousands of times per second can fill recording buffers and exceptions can be missed or lost.

To overcome these issues, the monitoring system adjusts the sampling rate for sampling windows based on how many samples were obtained for one or more prior sampling windows. The monitoring system tracks statistics per exception type so that the exception type and number are recorded. Generally, each sampling window has a fixed sampling interval. After each window is completed, the monitoring system adjusts the sampling interval for the next window based on a function (e.g., an exponential moving average) of the incoming data rate over last given number N of windows.

To accommodate occasional bursts of exceptions data being generated, the monitoring system is configured to maintain an over-sampling budget. This budget enables the monitoring system to 'borrow' bandwidth for use during bursts by moving the bandwidth overhead to be used later during relatively low bandwidth periods. Generally, the monitoring system is configured to avoid providing any latency or critical sections to the execution of the application that may cause disruption of the application execution. Additionally, because the monitoring system makes a decision to sample when each the exception is generated, reservoir sampling is not available. This approach enables the monitoring system to keep the sampling overhead approximately unchanged even though the monitoring system generally determines whether an exception is sampled or not the exception is generated.

A result is that monitoring system is configured to guarantee an accurate summary of the exceptions being generated for the one or more applications being executed without exceeding a specified bandwidth overhead for the system. For example, the monitoring system can set a threshold of 1-5% of overall system bandwidth to be used on performance monitoring. For example, in some implementations, the monitoring system can be configured to use less than 2-5 MB of compressed data per minute for storing and processing (e.g., profiling) exceptions data, even for high-scale data processing systems with many (e.g., dozens) application instances executing. Thus, the monitoring system is configured to use less computing bandwidth and less overhead relative to systems that use a static sampling rate.

The above advantages are enabled by one or more of the following implementations.

In a general aspect, a process for monitoring a performance of one or more computing systems includes configuring, by at least one processor, a sampling window for sampling exceptions data generated by at least one application instance being executed by a computing device. The exceptions data indicate an occurrence of at least one operation performed by the application instance. Configuring the sampling window comprises: determining a number of exceptions generated for a prior sampling window, determining a computing bandwidth that is available for monitoring the exceptions, and controlling a sampling rate of the sampling window based on the number of exceptions and the computing bandwidth. The process includes receiving, during the sampling window, the exceptions data generated by the at least one application instance. The process includes sampling, based on the sampling rate, the exceptions data. The process includes generating, based on the sampling, summary data representing the exceptions data.

In some implementations, controlling the sampling rate includes determining a moving average of the number of exceptions generated for the prior sampling window and one or more additional prior sampling windows. In some implementations, controlling the sampling rate includes controlling the sampling rate for the sampling window based on the moving average.

In some implementations, determining the computing bandwidth available includes setting an absolute threshold for a data production rate for performance monitoring. In some implementations, determining the computing bandwidth available includes setting a percentage threshold for a data production rate for performance monitoring, the percentage being a portion of a total available computing bandwidth.

In some implementations, controlling the sampling rate of the sampling window results in a data production rate of producing the summary data that is within a threshold range of a target production rate of producing the summary data.

In some implementations, the process includes determining, during the sampling window, that the computing bandwidth that is available for monitoring the exceptions is prematurely exceeded for the sampling window. The process includes storing, in a data store, sampled exceptions that are sampled after the available computing bandwidth is exceeded. The process includes processing the sampled exceptions that are stored in the data store once additional computing bandwidth is available.

In some implementations, the summary data comprises at least one full stack trace for each type of sampled exception of the exceptions data.

In some implementations, the summary data comprises metadata associated with the sampled exceptions data, the metadata including at least one of: a type of each sampled exception, a time that each exception is generated, an identifier indicating an instance of the application that generated the exception, and a count value associated with the exception.

In some implementations, the sampling window is of an identical size to the prior sampling window, and wherein the size of each sampling window is static.

In a general aspect, a system for monitoring a performance of one or more computing systems, includes at least one processor and a memory storing instructions that, when executed by the at least one processor, cause the at least one processor to perform operations. The operations include configuring, by at least one processor, a sampling window for sampling exceptions data generated by at least one application instance being executed by a computing device. The exceptions data indicate an occurrence of at least one operation performed by the application instance. Configuring the sampling window comprises: determining a number of exceptions generated for a prior sampling window, determining a computing bandwidth that is available for monitoring the exceptions, and controlling a sampling rate of the sampling window based on the number of exceptions and the computing bandwidth. The operations include receiving, during the sampling window, the exceptions data generated by the at least one application instance. The operations include sampling, based on the sampling rate, the exceptions data. The operations include generating, based on the sampling, summary data representing the exceptions data.

In some implementations, controlling the sampling rate includes determining a moving average of the number of exceptions generated for the prior sampling window and one or more additional prior sampling windows. In some implementations, controlling the sampling rate includes controlling the sampling rate for the sampling window based on the moving average.

In some implementations, determining the computing bandwidth available includes setting an absolute threshold for a data production rate for performance monitoring. In some implementations, determining the computing bandwidth available includes setting a percentage threshold for a data production rate for performance monitoring, the percentage being a portion of a total available computing bandwidth.

In some implementations, controlling the sampling rate of the sampling window results in a data production rate of producing the summary data that is within a threshold range of a target production rate of producing the summary data.

In some implementations, the operations include determining, during the sampling window, that the computing bandwidth that is available for monitoring the exceptions is prematurely exceeded for the sampling window. The operations include storing, in a data store, sampled exceptions that are sampled after the available computing bandwidth is exceeded. The operations include processing the sampled exceptions that are stored in the data store once additional computing bandwidth is available.

In some implementations, the summary data comprises at least one full stack trace for each type of sampled exception of the exceptions data.

In some implementations, the summary data comprises metadata associated with the sampled exceptions data, the metadata including at least one of: a type of each sampled exception, a time that each exception is generated, an identifier indicating an instance of the application that generated the exception, and a count value associated with the exception.

In some implementations, the sampling window is of an identical size to the prior sampling window, and wherein the size of each sampling window is static.

In a general aspect, one or more on-transitory computer readable media store instructions for monitoring a performance of one or more computing systems. The instructions cause, when executed by at least one processor, the at least one processor to perform operations. The operations include configuring, by at least one processor, a sampling window for sampling exceptions data generated by at least one application instance being executed by a computing device. The exceptions data indicate an occurrence of at least one operation performed by the application instance. Configuring the sampling window comprises: determining a number of exceptions generated for a prior sampling window, determining a computing bandwidth that is available for monitoring the exceptions, and controlling a sampling rate of the sampling window based on the number of exceptions and the computing bandwidth. The operations include receiving, during the sampling window, the exceptions data generated by the at least one application instance. The operations include sampling, based on the sampling rate, the exceptions data. The operations include generating, based on the sampling, summary data representing the exceptions data.

In some implementations, controlling the sampling rate includes determining a moving average of the number of exceptions generated for the prior sampling window and one or more additional prior sampling windows. In some implementations, controlling the sampling rate includes controlling the sampling rate for the sampling window based on the moving average.

In some implementations, determining the computing bandwidth available includes setting an absolute threshold for a data production rate for performance monitoring. In some implementations, determining the computing bandwidth available includes setting a percentage threshold for a data production rate for performance monitoring, the percentage being a portion of a total available computing bandwidth.

In some implementations, controlling the sampling rate of the sampling window results in a data production rate of producing the summary data that is within a threshold range of a target production rate of producing the summary data.

In some implementations, the operations include determining, during the sampling window, that the computing bandwidth that is available for monitoring the exceptions is prematurely exceeded for the sampling window. The operations include storing, in a data store, sampled exceptions that are sampled after the available computing bandwidth is exceeded. The operations include processing the sampled exceptions that are stored in the data store once additional computing bandwidth is available.

In some implementations, the summary data comprises at least one full stack trace for each type of sampled exception of the exceptions data.

In some implementations, the summary data comprises metadata associated with the sampled exceptions data, the metadata including at least one of: a type of each sampled exception, a time that each exception is generated, an identifier indicating an instance of the application that generated the exception, and a count value associated with the exception.

In some implementations, the sampling window is of an identical size to the prior sampling window, and wherein the size of each sampling window is static.

The details of one or more embodiments are set forth in the accompanying drawings and the description below. Other features and advantages will be apparent from the description and drawings, and from the claims.

DETAILED DESCRIPTION

Figure 1:
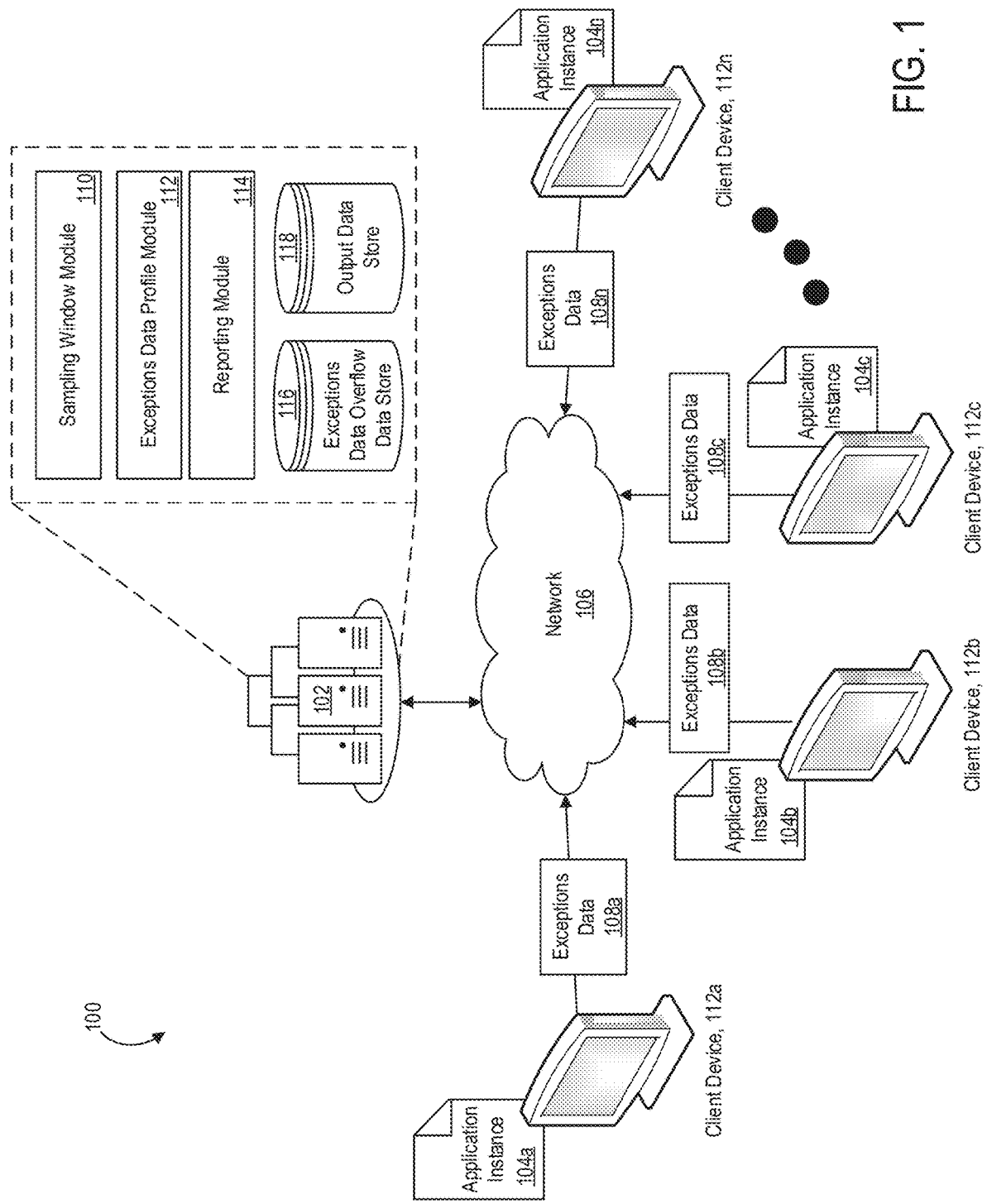
FIG. 1 is a diagram illustrating an example computing environment for a monitoring system configured for performing sampling exception profiling with a controlled data rate.

FIG. 1 is a diagram of an example computing environment 100 for networked computing system including a monitoring system 102 for one or more client devices 112*a-n*. The client devices 112*a-n* are configured for executing respective instances 104*a-n* of an application 104 (e.g., monitoring an application execution thread). The monitoring system 102 is configured to monitor performance of the client devices 112*a-n* with a controlled (e.g., constant or nearly constant) data rate consumed for the monitoring operations. The data rate includes a computing bandwidth representing a portion of the computing resources available to the monitoring system 102 and the one or more client devices 112*a-n*. As previously stated, computing bandwidth refers to the available processing of the system that is available to perform processing operations, and can be measured in computing cycles (e.g., processing time) or a similar metric. This is also called a performance monitoring overhead.

The monitoring system 102 controls a the performance monitoring overhead used for monitoring the one or more client devices 112a-n by the monitoring system 102 so as not to exceed a threshold level of computing resources available to the monitoring system and the client devices. Generally, even during periods of high activity for the client devices 112a-n, the monitoring system 102 is configured to accurately summarize a performance of the client devices 112a-n and the applications 104a-n while controlling the bandwidth used for monitoring below a threshold level. For example, the monitoring system 102 can control the amount of computing bandwidth used for performance monitoring the execution of the applications 104a-n by the respective client devices 112a-n. The monitoring system 102 may limit the bandwidth to an absolute threshold, such as less than 5 MB (Megabytes) per minute. In some implementations, the monitoring system 102 may limit the bandwidth to a relative threshold, such as less than 25% of a profiling bandwidth or less than 1-5% of overall system bandwidth. In other words, where an overhead for all profiling is generally about 2-5%, the budget for exception profiling is about 0.25-1%. The actual overhead varies because there is a fixed cost per exception, even when sampling. If applications have many errors, a higher overhead can be used.

The client devices 112a-n are each configured to execute respective application instances 104a-n. The application instances 104a-n can be software programs that are configured to perform any computing purpose monitoring system 102. For example, client devices 112a-n, by the application instances 104a-n, can be configured to host websites, data farms, cloud computing functionality, or any such purpose. The application instances 104a-n can be identical or different from one another. The client devices 112a-n can operate independently from one another or can operate together and send data to and from one another over the network 106.

The one or more client systems 112a-n are generally distributed over a computing network 106, each executing one or more instances 104a-n of the application 104. The monitoring system 102 generally includes a data processing system configured to communicate with the client systems 112a-n on the network 106. The monitoring system 102 is configured to monitor how the application instances 104a-n are executing by tracking execution exceptions that are generated by the client devices 112a-n and reported to the monitoring system over the network 106.

The monitoring system 102 is configured to receive the exceptions data 108a-n of the application instances 104a-n. Generally, the exceptions data 108a-n are generated by the one or more respective instances 104a-n of the application during execution and can be reported in real time (e.g., when generated) to the monitoring system 102. The exceptions generally include exceptions data 108a-n such as respective stack traces that each illustrate how an application instance 104a-n is executing. The exceptions can be one or more different types, such as those indicative of different errors or operations occurring from the one or more application instances 104a-n. In some implementations, the stack traces of the exceptions data 108a-n show a series of operations or actions performed by the application that caused the exception to occur. The exceptions data 108a-n generally include metadata or other data specifying circumstances of the exception generation, such as a client device identifier of the client device that generated the exception, a time stamp associated with the time when the exception was generated, a version of the application instance 104a-n, and so forth.

The monitoring system 102 is configured to generate a summary of the exceptions using an exceptions data profile module 112. The summary generally profiles the exceptions data 108a-n and includes a subset of the exceptions data 108a-n in addition to other data generated from the profile of the exceptions data. For example, the profile module 112 of the monitoring system 102 can generate a statistical summary of the exceptions data and generate on or more reports including the summary. Generating a profile can include generating summary data representing the exceptions. The summary generally includes a representation of the exceptions without including all the data of the application exceptions. For example, the profile can include a statistical summary of the exceptions and additional data that together provide a representation of exceptions that are being generated by the one or more application instances. For example, the summary can include a representation of how many times each different type of exception is generated, a frequency associated with generating the exceptions from each client device 112a-n or from a group of the client devices, a rate of receiving the exceptions over a period of time, comparisons of exceptions generation to historical levels (e.g., a historical average), and so forth. This summary can be used by the profile module 112 to determine how the application instances 104a-n are executing, and whether there are any issues for execution of the application instances. In an example, the monitoring system 102 generates additional data including metadata associated with the exceptions data or portions of the exceptions data.

The summary does necessarily include an entire stack trace of each exception, or even part of the data 108a-n from each exception. Rather, the monitoring system 102 generates the summary from a sample of the data 108a-n of the exceptions. The monitoring system 102 uses sample data sampled from the exceptions data 108a-n to generate the representation of what exceptions are generated by the application instances 104a-n.

The monitoring system 102 is configured to select samples of the exceptions data to ensure that the generated representation of the exceptions data 108a-n that is an accurate representation. Sampling the exceptions data includes storing or saving the exceptions data 108a-n to a data store for including in a profile and/or summary, as subsequently described. For example, the monitoring system 102 selects samples of the exceptions to determine how many exceptions of each type are being generated by the one or more application instances 104a-n. For example, the monitoring system 102 is configured to sample the exceptions data 108a-n to determine where, during execution of the one or more instances of the applications 104a-n, the exceptions are being generated. More specifically, the monitoring system 102 is configured to determine what the state of a given application instance 104a-n is when the exception is generated by that application instance.

The monitoring system 102 samples the exception data 108a-n using an adjustable sampling frequency over one or more sampling windows. Each window represents a period of time. Generally, the windows are of the same size as one another and thus represent the same time periods. The sizes of the sampling windows can depend on the particular application to be monitored and the scale of the networked computing system including the monitoring system and the client devices 112a-n. For example, the sampling windows can be 500 milliseconds in duration. In other examples, the sampling windows can be longer or shorter as needed (e.g., 100 ms, 200 ms . . . 1 s, 5 s, 1 minute, and so forth). The monitoring system 102 generally sizes the sampling windows approximately equally over time, even as a production rate (e.g., occurrence) fluctuates for exceptions generated by the one or more instances of the application instances 104a-n.

The sampling window module 110 of the monitoring system 102 adjusts a sampling frequency as the application instances 104a-n execute on the client devices 112a-n. In some implementations, the monitoring system 102 obtains samples at a given frequency (e.g., sampling rate) during a sampling window, which represents a period of time for monitoring the one or more application instances 104a-n. The monitoring system 102 re-computes a sampling rate (e.g., a number of samples taken per exceptions generated) associated with a next sampling window. For example, the sampling rate can be adjusted to maintain a desired sampling overhead bandwidth under a limit for an overall length of time (e.g. a day, an hour, a minute, etc.). The sampling rate is determined based on the sample data obtained from at least one previous sampling window. For example, if a number of exceptions received is increased, the monitoring system 102 decreases a rate of the sampling for the next sampling window. If the number of exceptions is decreased relative to earlier sampling windows, the monitoring system 102 can increase the sampling rate.

The sampling window module 110 of the monitoring system 102 is configured to adjust the sampling rate for each window as each sampling window begins. The monitoring system 102 determines whether a particular exception is to be sampled at the instant that the exception is generated. This is because of requirements for monitoring the execution of the application (imposed by monitoring programs such as JAVA FLIGHT RECORDER). In this example, the sampling decision is made when the exception occurs during runtime. The decision cannot be postponed to a later time. These requirements do not allow the monitoring system 102 to perform reservoir-based sampling. The monitoring system 102 overcomes this restriction using the adjustable sampling rates for each of the sampling windows. As previously stated, the sampling rate is recomputed for a subsequent sampling window as the previous sampling window ends and the subsequent sampling window commences.

To accommodate occasional bursts of exceptions from the application instances 104a-n, the monitoring system 102 is configured to maintain an over-sampling budget and store the overflow data in an exceptions data overflow data store 116. The data store 116 enables the monitoring system 102 to borrow bandwidth capacity during exceptions data bursts from subsequent sampling windows. The monitoring system 102 then, during periods in which fewer exceptions are generated by the application instances 104a-n, the monitoring system 102 is configured to use the excess capacity to process the previously unprocessed sample data.

The monitoring system 102 is configured to gather samples in order to generate summaries without impacting system performance. The monitoring system 102 operations such that there is either no latency added to the networked computing system or very minimal latency added to the networked computing system. Additionally, each exception type is guaranteed to have at least one sample. At least one copy of the full exception data 108a-n stack trace is stored (e.g., in data store 116). The at least one copy of the full stack trace for each exception type is stored for presenting the example to a user as part of an output summary representing the exceptions data 108a-n. The at least one copy is registered in the monitoring system 102 (e.g., in data store 116). The full stack trace of the at least one copy shows how the exception was generated by the application 104.

The monitoring system 102 is configured to summarize the content of the exceptions data 108a-n from the application instances 104a-n without analyzing the entire set of exceptions data. This reduces a processing cost associated with monitoring the application execution relative to a monitoring system that unrolls each exception to determine the cause of the exception. Further, the monitoring system does not need to run an exception event each time an exception is generated by the application instances 104a-n in order to handle the exception control execution of the application instances. The monitoring system 104 maintains an exact record of the number of instances per exception type is maintained. Additionally, an exception is force-sampled when that exception is the first instance of an exception type that is received by the monitoring system 104. Force sampling includes storing a sample of the exception, even if the sampling probability data indicate that a sample should not be taken at that time. Force sampling each new exception type ensures availability of stacktrace data for every exception type, even for very rarely encountered exception types. The monitoring system 102 is configured to determine that a given number of exceptions are being generated and sample at a given sampling rate based on the number of exceptions being generated. The monitoring system does not need to analyze the unsampled exceptions to determine how the application instances 104a-n are executing because the representation can be constructed from the sampled exceptions.

The monitoring system 102 adjusts the sampling rate over time to ensure that the data overhead for analysis of the exceptions data 108a-n is relatively constant. The monitoring system 102 thus analyses the stream of exceptions data 108a-n (e.g., from a data thread) over time as the applications are executing. When sampling, the monitoring system 102 determines a time in the data thread at which the exception is generated and obtains an associated stack trace. As previously described, the samples are spread evenly over a sampling window so that changes in thread execution are not missed. The sampling windows are associated with time periods, but are different than time intervals. The sampling windows do not need to be associated with a specific execution time. The sampling widows each represent a unit time for which the sampling rate is adjusted by the monitoring system 102. The rate is adjusted for each sampling window as needed to ensure a constant or nearly constant data rate overhead (e.g., with a 5% threshold).

The monitoring system 102 can control the sampling rate in a variety of ways. For example, the sampling window module 110 of the monitoring system 102 can use a proportional/integrate/differential (PID) feedback-based controller to adjust the sample rate for the sampling windows. If the sampling rate is too high such that the overhead bandwidth increases near to the threshold or over the threshold limit, the sampling window module 110 changes the sample interval for the subsequent windows to reduce the bandwidth usage to satisfy the threshold. As previously stated, the threshold can be a hard limit such that samples dropped when the threshold bandwidth is reached. The monitoring system 102 thus sets a target rate and after each window determines the expected rate for next window(s). The monitoring system 102 can set rate for a next window or for multiple subsequent windows based on one or more functions. For example, the previous sampling rate can be a part of a moving average, can be associated with a decaying weight value as additional windows occur, or determined by a similar function. For example, the monitoring system 102 can be configured for targeting about 10,000 exceptions per minute or any other such value. The oversampling buffer for handling unexpected bursts of exceptions being generated can be sized depending on the target number of samples per minute. For example, the buffer can accommodate 20% over sampling (e.g., 2,000 samples for a 10,000 sample target). In this example, if buffer space is available (e.g., in data store 116), the sample is obtained. If no further storage is available, the monitoring system 102 drops the sample and increments a count of the exception type. When the high-activity period (including the data burst) ends, the monitoring system 102 is configured to empty the buffer over time to avoid impacting the overhead computing rate.

The sampling rate can be based on one or more factors. For example, the sampling rate can be based on how much computing space is available for performance monitoring of exceptions for the application 104. A typical budget can be 2-3 megabytes (MB) of compressed data per minute for an application. As the number of exceptions generated increases, the computing bandwidth budget can be increased accordingly (e.g., by an order of magnitude or more). As a relative computing cost in comparison to other functionality of the application, performance monitoring for exception handling generally is restricted to 1-5% of the computing bandwidth available. In some implementations, the monitoring system 102 is configured to handle 100,000 data events per minute, where 10,000-20,000 of the events are for exception profiling. In some implementations, the budget can be up to 10-20% of the available bandwidth if needed.

The monitoring system 102 is configured to generate a profile of the sampled exceptions data. The profile can include binary data in the form of events (e.g., specified actions or operations of the application) that have occurred during the sampling period. The sampling period may be ongoing as the profile data are generated and/or reported. The profile can include a stack trace for each new event in the profile (e.g., an event that is observed to be occurring for the first time). A full stack trace can be stored for each event type. A type of the exception generated is associated with each event. A time stamp associated with the exception thread generation and what the thread includes can be stored in the profile. The sampled exceptions data and the associated metadata are configured by the exceptions data profile module 112 into structured data. The structured data can be presented to a user by one or more visualizations or reported to another computing system for another use.

A reporting module 114 of the monitoring system 102 is configured to generate reports that include the profile data. The type of report generated can be specified by a user or another computing system depending on how the profile data are being used. For example, output data generated by the reporting module 114 can include a histogram of which exceptions were generated their types and counts for each type. In other examples, subsequently described, visualizations such as line graphs, tables, or other outputs are generated. These can be continuously or intermittently updated as sampling continuous on an ongoing basis along with reporting.

Figure 7:
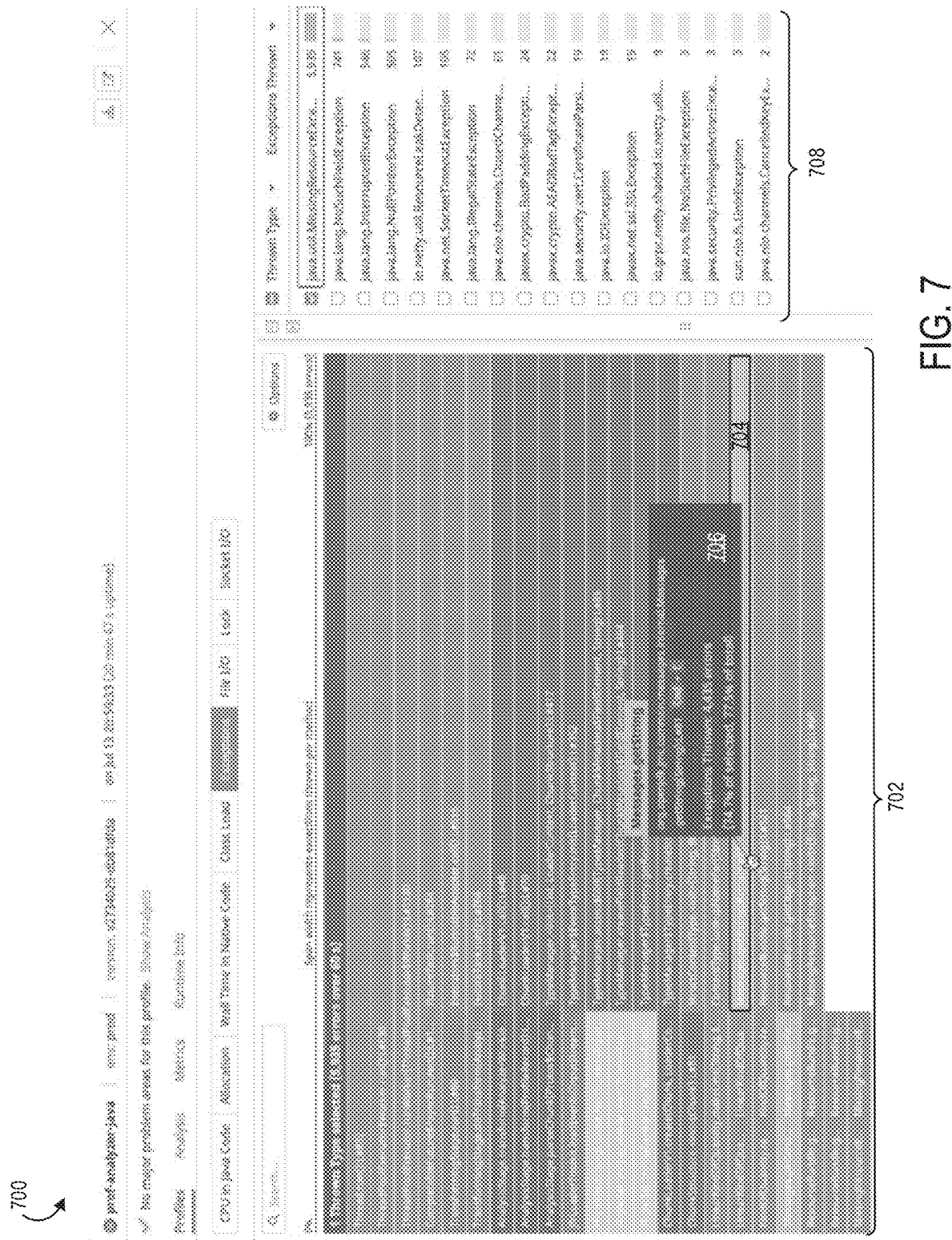
FIG. 7 shows an example user interface for reporting summary data.

The output data can be stored in an output data store 118 and used for one or more other purposes. For example, the results can be sent to a monitoring dashboard in real time or near real time. Here, real time includes a processing of data as its received and immediate output of that data without delaying, in which any latency is generally caused by the processing of the data (rather than internally storing any data for batch processing). Real time or near real time indicators can show how many exceptions are being generated per second and their types. The profiling can be "always on" in production such that sampling continuous even as profile data are generated and reported. Various alerts, alarms, etc. can be set for triggering in response to particular results of the profile data. For example, particular exceptions exceeding given threshold values can cause alarms or alerts to be generated and sent to an operator of the networked computing system. Other similar reporting applications are possible. An example output report 700 is shown in FIG. 7, subsequently described.

As described above, the monitoring system 102 is communicatively connected to the client devices 112*a-n* and the computing system 102 through a network 106. The monitoring system 102 can include, but are not limited to, e.g., one or more server computers. The monitoring system 102 can be configured to transmit, receive, and/or process data. For instance, in some cases, the monitoring system 102 can be a web server configured to receive and store content (e.g., web content, such as a web page), and make the content available to one or more other computer systems (e.g., client devices 112*a-n*). Upon receiving a request (e.g., from the client devices 112*a-n*), the monitoring system 102 can retrieve the requested content (e.g., resource 120 and its structure data 118), and transmit the content to the requesting computer system to fulfill the request. In some cases, the monitoring system 102 can be owned, operated, and/or maintained by parties different from those that own, operate, and/or maintain the computing system 102.

The computing system 102 is also communicatively connected to one or more client devices 112*a-n* through the network 106. Each client devices 112*a-n* can include a respective user interface. Users can interact with the user interface to view content of the application instances 104*a-n*. Users can also interact with the user interface to transmit data to other devices (e.g., to the monitoring system 102). Users can interact with the user interface to issue commands (e.g., to the monitoring system 102). In some implementations, a user can install a software application onto a client devices 112*a-n* in order to facilitate performance of these tasks.

The client devices 112*a-n* can include any electronic device that is used by a user to view, process, transmit and receive data. Examples of the client devices 112*a-n* include computers (such as desktop computers, notebook computers, server systems, etc.), mobile computing devices (such as cellular phones, smartphones, tablets, personal data assistants, notebook computers with networking capability), and other computing devices capable of transmitting and receiving data from the network 106. The client devices 112*a-n* can include devices that operate using one or more operating system (e.g., Microsoft Windows, Apple OSX, Linux, Unix, Android, Apple iOS, etc.) and/or architectures (e.g., x86, PowerPC, ARM, etc.) In some implementations, the client devices 112*a-n* need not be located locally with respect to the rest of the environment 100, and can be located in one or more remote physical locations.

The network 106 can be any communications network through which data can be transferred and shared. For example, the network 106 can be a local area network (LAN) or a wide-area network (WAN), such as the Internet. The network 106 can be implemented using various networking interfaces, for instance wireless networking interfaces (such as Wi-Fi, Bluetooth, or infrared) or wired networking interfaces (such as Ethernet or serial connection). The network 106 also can include combinations of more than one network, and can be implemented using one or more networking interfaces.

The monitoring system 102 is illustrated as a respective single component. However, in practice, each can be implemented on one or more computing devices. In some implementations, the monitoring system 102 can include multiple computing devices that are connected to the network 106. The monitoring system 102 can alternatively be a single computing device that is connected to the network 106. In some implementations, the monitoring system 102 need not be located locally to the rest of the environment 100, and portions of the monitoring system 102 can be can be located in one or more remote physical locations from the client devices 112a-n.

Figure 2:
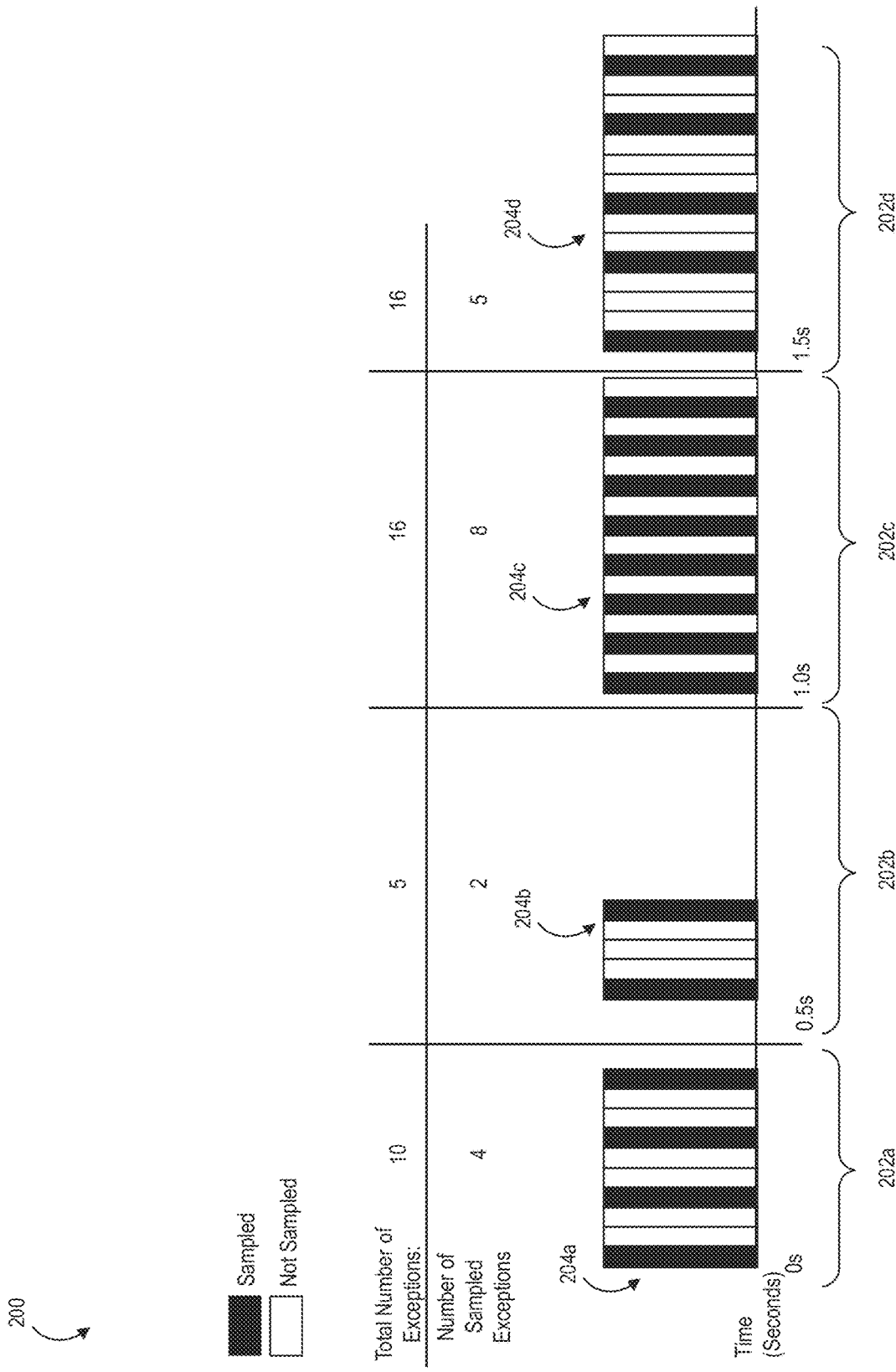
FIGS. 2-3 illustrate examples of sampling windows.

FIG. 2 shows an illustration of a sampling environment 200 of the monitoring system 102. The sampling environment 200 includes a plurality of sampling windows 202a-d. Each of the windows 202a-d corresponds to a 500 millisecond period of time. Each window 202a-d includes a set 204a-d of one or more exceptions, a subset of which are sampled exceptions. The number of sampled exceptions depends on the sampling rate specified for the sampling window. As previously described, the sampling rate is adjusted based on the number of exceptions for prior sampling windows.

In the example of FIG. 2, there are 10 exceptions that occur during a first sampling window 202a. A predefined sampling rate for the monitoring system (e.g., monitoring system 102 of FIG. 1) results in four sampled exceptions for the time period. The monitoring system adjusts the sampling rate slightly, from every $3^{rd}$ exception (33%) to every $4^{th}$ exception (25%) to reduce the overhead bandwidth for processing 4 exceptions during this period. In the second sampling window 202b, there are only 5 exceptions generated, and only two samples are obtained. The monitoring system increases the sampling rate for subsequent sampling windows in response to a determination that the monitoring budget has not yet been met. The sampling rate is adjusted up to 50% of exceptions (every other exception). In the third sampling window 202c, 16 exceptions occur and eight samples are obtained. If the processing bandwidth budget is met or exceeded, excess samples are stored in a sample buffer, as previously described. The monitoring system again reduces the sampling rate, but now the monitoring system has data from three sampling windows. The sampling rate is lowered below the initial 33% that exceeded the budget, but not all the way to the 25% in which excess budget was available. The sampling rate is lowered to about 30%. In the fourth sampling widow 202d, 16 exceptions occur and 5 are sampled. This results in a processing overhead near to the allotted budget.

Figure 3:
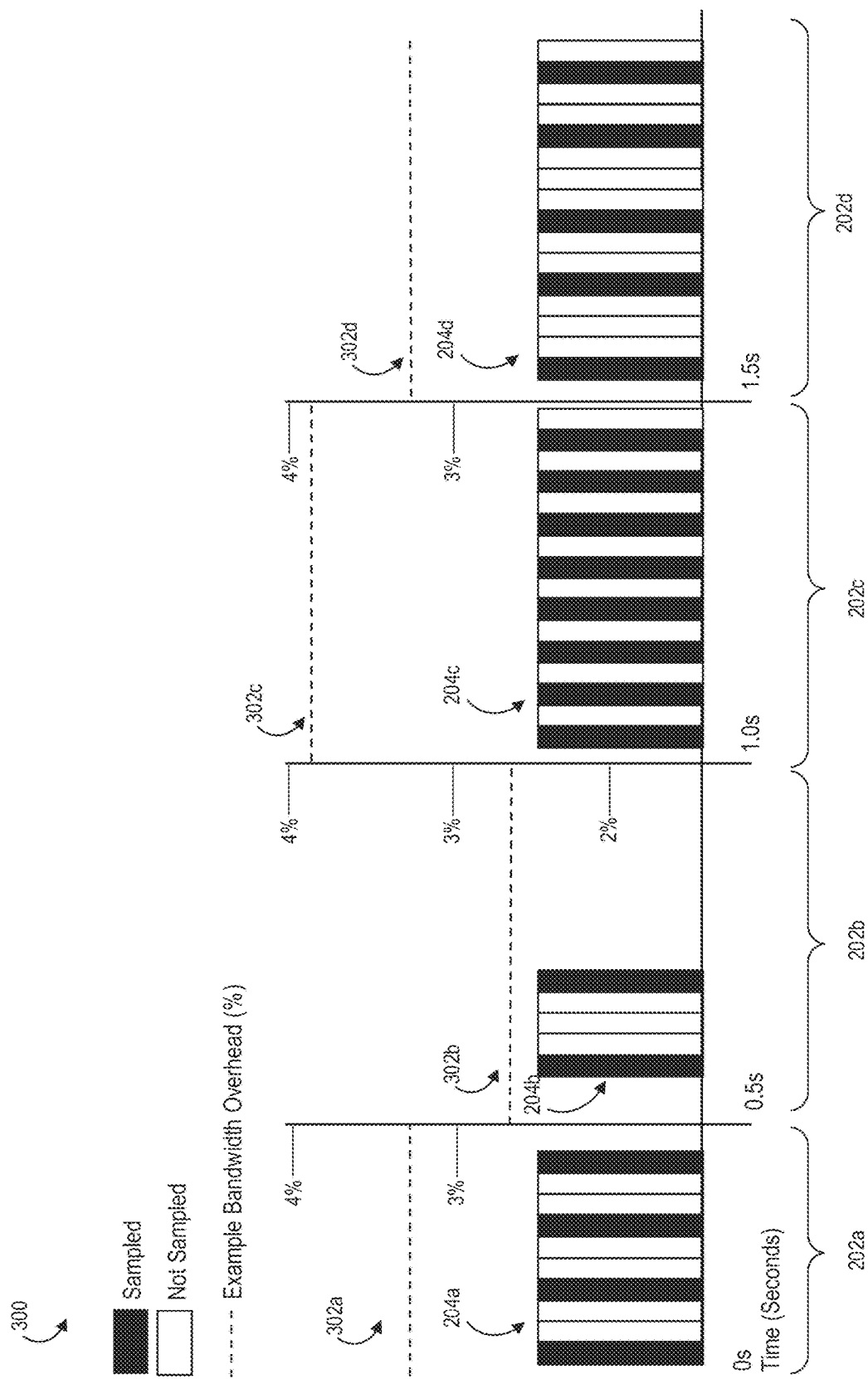

Examples of relative processing overhead levels 302a-d (as a percentage of overall computing bandwidth) for the sampling windows 202a-d are shown in FIG. 3. The example levels 302a-d shown are example values of a given available processing bandwidth for a system. For example, the first sampling window 202a has a bandwidth overhead percentage that is relatively higher than level 302b of window 202b. For example, the first sampling window 202a has a bandwidth overhead percentage that is relatively lower than level 302c of window 202c. For example, the first sampling window 202a has a bandwidth overhead percentage that is approximately the same as level 302d of window 202d.

Figure 4:
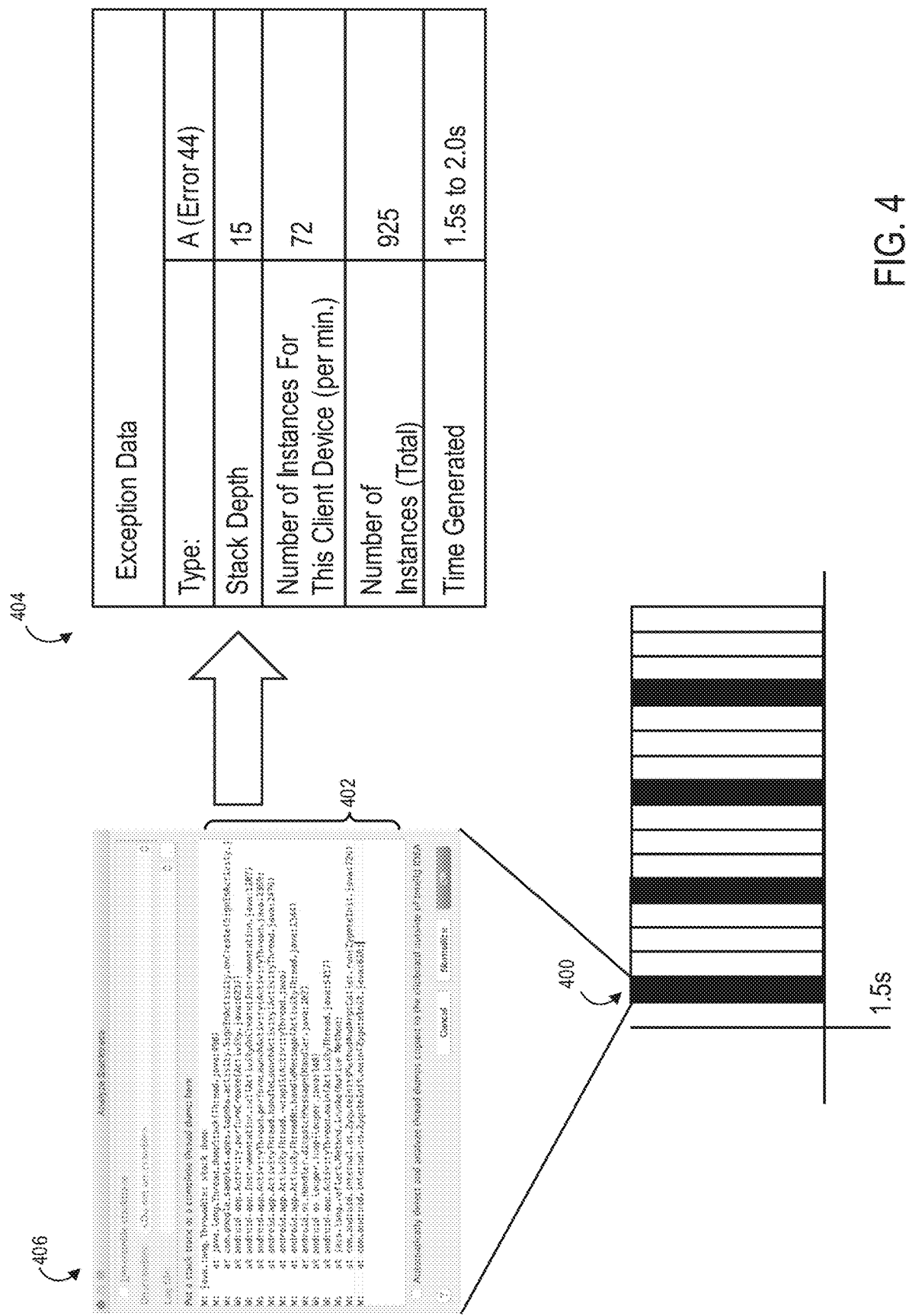
FIGS. 4-6 illustrates examples of summary data summarizing sampled exceptions data.

FIG. 4 illustrates an example of sampled exception data 400. The sampled exception data 400 is a first instance of an exception of a given exception type. A stack trace 402 is stored with other metadata 404 that describes the sampled exception. The trace can be presented in an interface 406 when accessed by a user. The particular sampled exception 400 includes a stack trace with a stack depth of 15. The type is type A, corresponding to an error #44. Though not shown in FIG. 4, the sampled instance is one of 72 obtained per minute for the client device being monitored. Over all the client devices monitored, there are 925 instances of the exception being generated. This data is example data for illustrative purposes.

Figure 5:
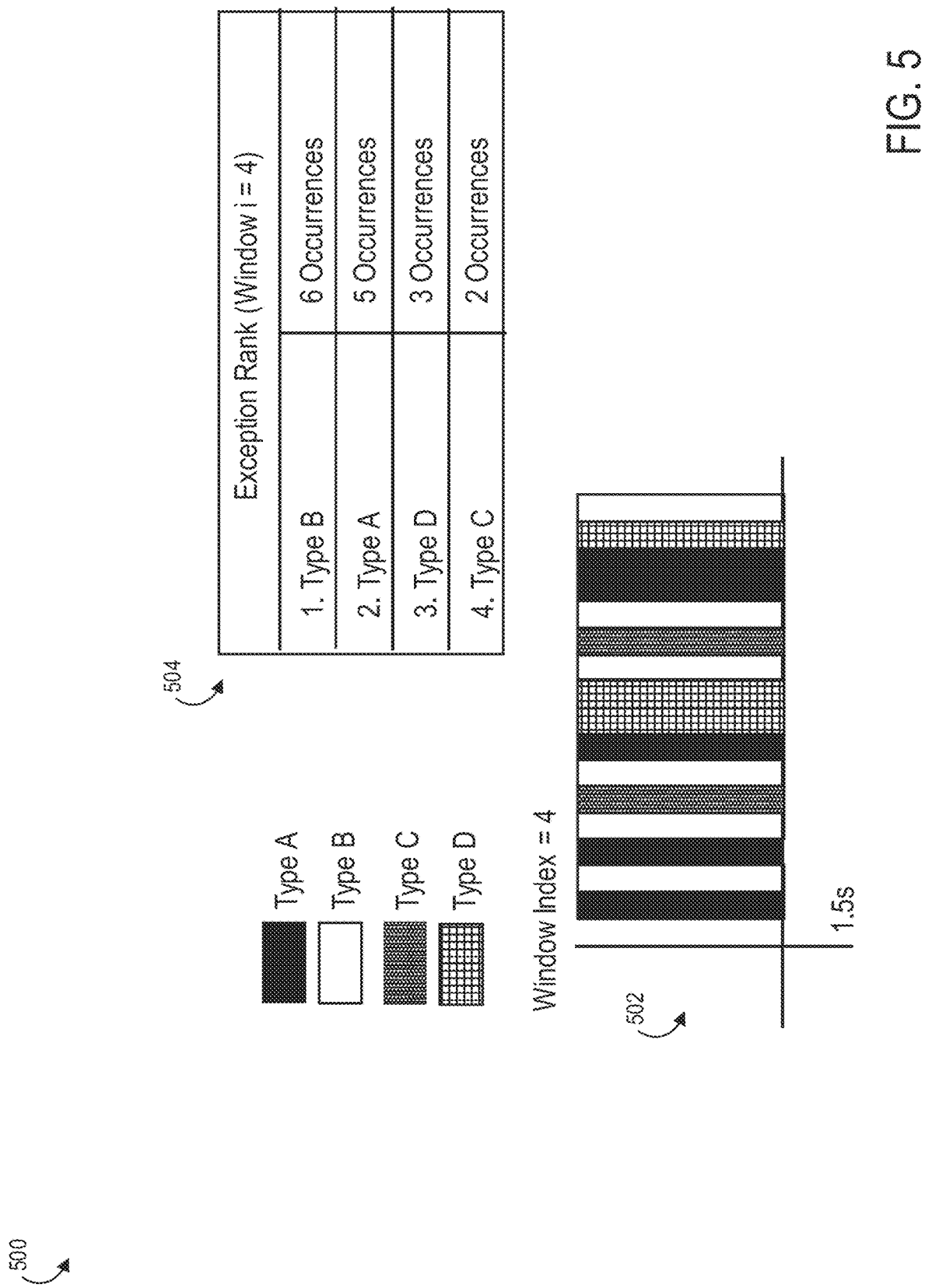

FIG. 5 illustrates an example profile 500 generated for sampled exceptions of a given sampling window 502. The sampling window has an index value of 4 (e.g., it is the $4^{th}$ window of a set). Four types of exceptions are sampled during the window, including type A, type B, type C, and type D. Each is associated with a given number of occurrences, as shown in metadata table 504.

Figure 6:
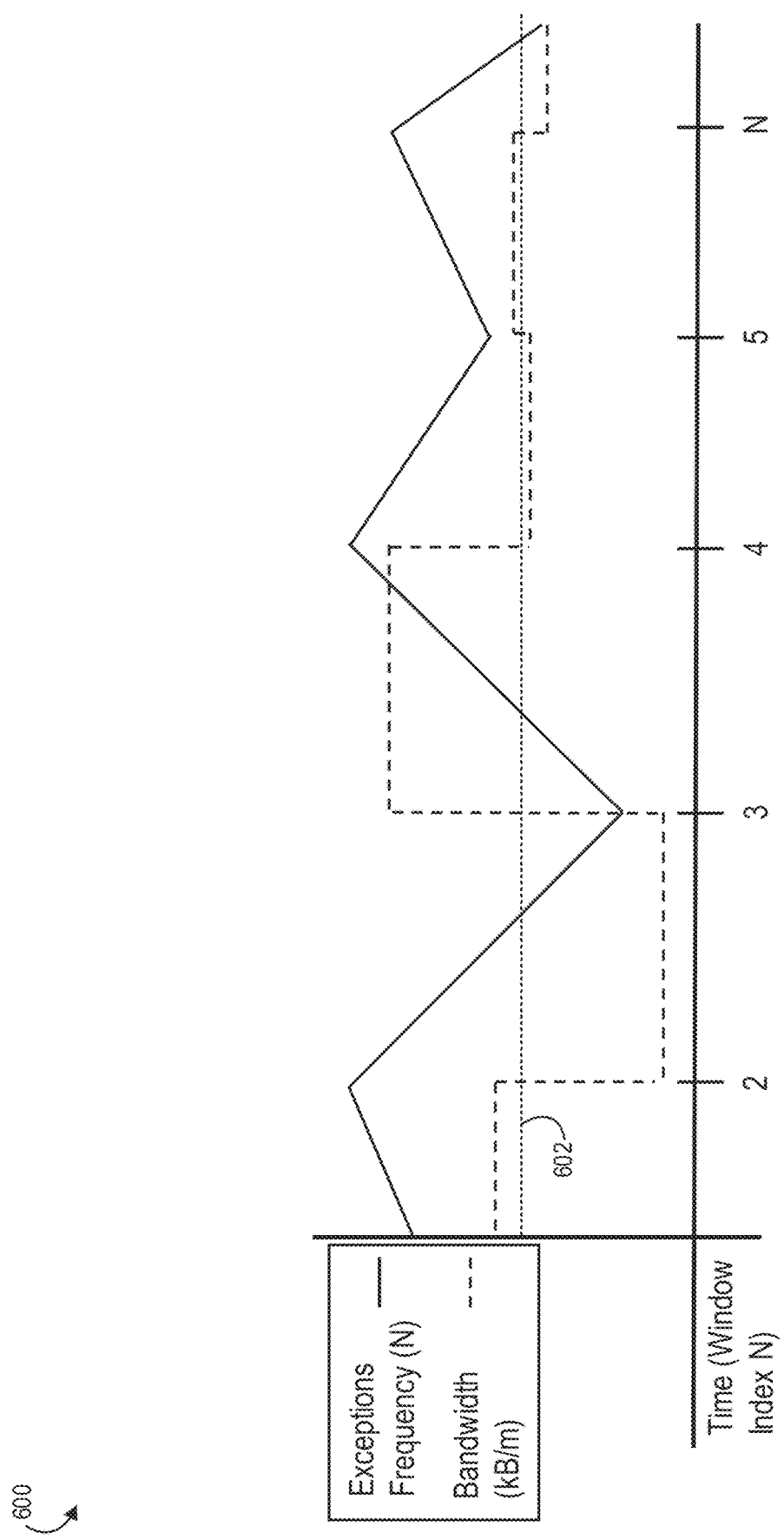

FIG. 6 shows an illustration of an example timeline graph 600 of processing overhead corresponding to a number of exceptions being generated by a computing system (e.g., one or more client devices 112a-n of FIG. 1). As shown in graph 600, the bandwidth overhead is relatively volatile over the first several sampling windows. However, the adjusted sampling rate is updated for each window and causes the processing overhead to settle near the desired threshold (marked by line 602), even as the frequency of exceptions remains volatile.

FIG. 7 shows an illustration of an example user interface 700. A group for exceptions 702 are shown. The exceptions are grouped based on common thread events, and split into their respective types based on differing events for each exception. A selected exception 704 shows additional metadata 706 associated with the exception. For example, for exception 704, the metadata 706 reports that there are 4,435 instances of the exception generated over 60 seconds, which is 77.5% of the total number of exceptions generated. The selected exception 704 is shown in a list 708 of each exception type, sorted by frequency of occurrence.

Figure 8A:
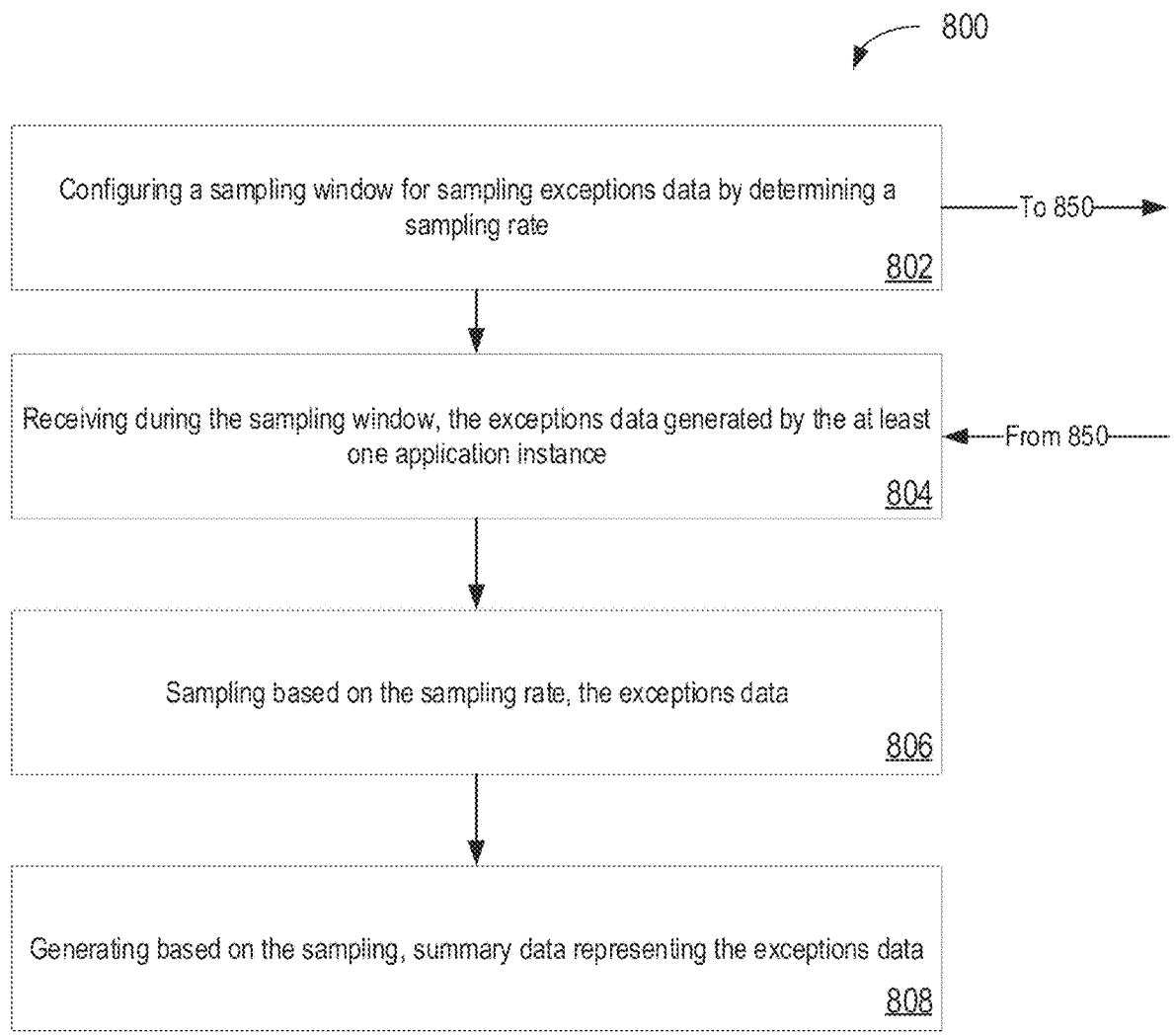
FIGS. 8A-8B show example processes for monitoring a performance of one or more application instances.
Figure 8B:
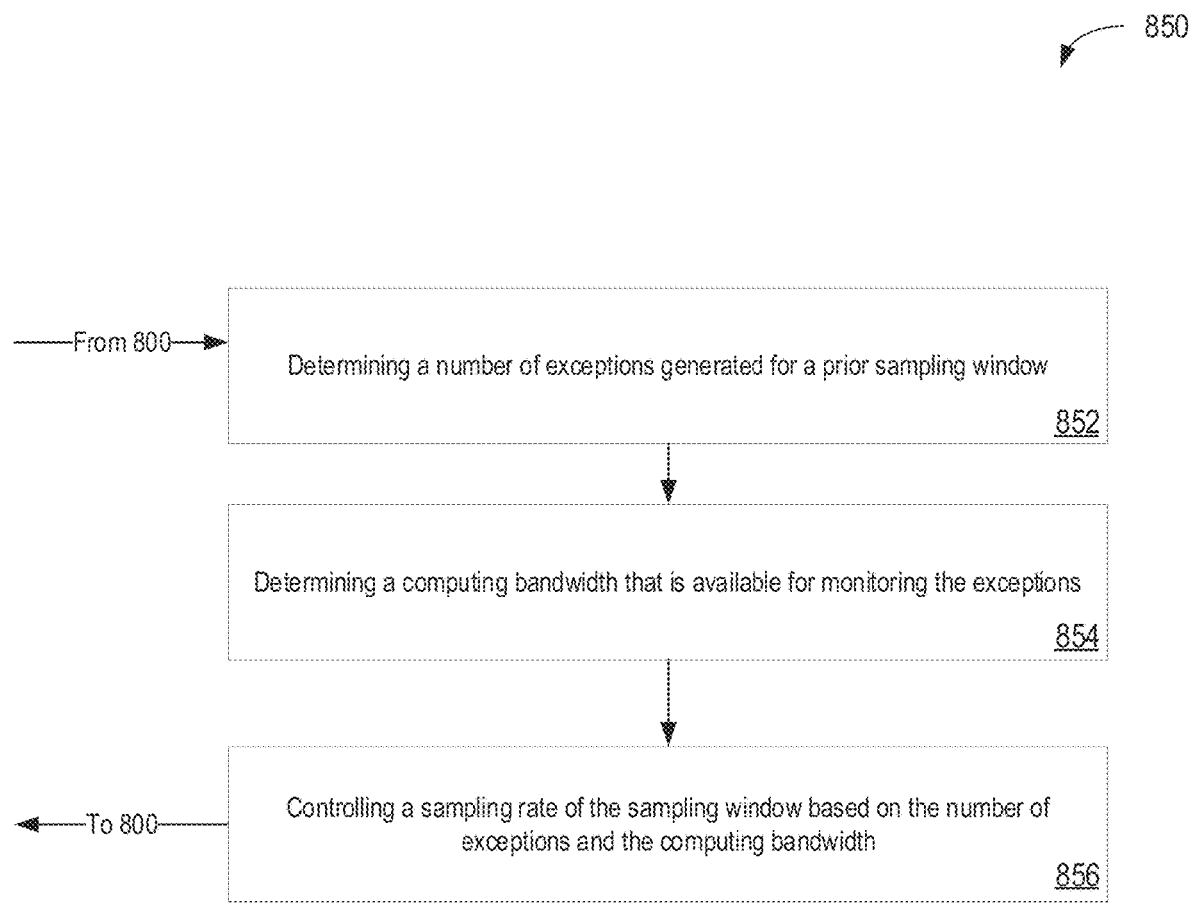

FIGS. 8A-8B shows example processes for exception sampling and profiling with controlled data rate by a monitoring system (e.g., the monitoring system 102 described in relation to FIG. 1). The process 800 of FIG. 8A includes configuring (802) a sampling window for sampling exceptions data by determining a sampling rate. FIG. 8B shows an example process 850 for configuring the sampling window. The process 850 includes determining (852) a number of exceptions generated for a prior sampling window. As previously described, determining the number of exceptions is based on a record including an exact record of the number of instances per exception type. Additionally, an exception is force-sampled, or sampled even if it should not be according to the current sampling probability, when that exception type first occurs. The forced sampling ensures availability of stacktrace data even for rare exception types, which may have few instance (e.g., less than 10 instances). The process 850 includes determining (854) a computing bandwidth that is available for monitoring exceptions. As previously described, the bandwidth is based on how much computing space is available for performance monitoring of exceptions for the application. A typical budget can be 2-3 megabytes (MB) of compressed data per minute for an application. As the number of exceptions generated increases, the computing bandwidth budget can be increased accordingly (e.g., by an order of magnitude or more). As a relative computing cost in comparison to other functionality of the application, performance monitoring for exception handling generally is restricted to 1-5% of the computing bandwidth available.

The process 850 includes controlling (856) a sampling rate of the sampling window based on the number of exceptions and the computing bandwidth.

Returning to FIG. 8A, once the sampling window is computed, the process 800 includes receiving (804), during the sampling window, the exceptions data generated by the at least one application instance. As previously described in relation to FIG. 1, the exceptions data are generated by one or more respective instances of the application during execution and can be reported in real time (e.g., when generated) to the monitoring system performing process 800. The exceptions generally include exceptions data such as respective stack traces that each illustrate how an application instance is executing. The exceptions can be one or more different types, such as those indicative of different errors or operations occurring from the one or more application instances. In some implementations, the stack traces of the exceptions data show a series of operations or actions performed by the application that caused the exception to occur.

The process 800 includes sampling (806) based on the sampling rate, the exceptions data. The monitoring system 102 is configured to select samples of the exceptions data to ensure that the generated representation of the exceptions data that is an accurate representation of the overall exceptions data. For example, the process 800 includes sampling, by the monitoring system, the exception data using an adjustable sampling frequency over one or more sampling windows. Each window represents a period of time. The process 800 can include adjusting a sampling frequency as the application instances execute on the client devices. The process 800 can include adjusting the sampling rate for each window as each sampling window begins. To accommodate occasional bursts of exceptions from the application instances, process 800 can include maintaining an oversampling budget and store the overflow data in an exceptions data overflow data store.

The process 800 includes generating (808) based on the sampling, summary data representing the exceptions data. The summary generally profiles the exceptions data and includes a subset of the exceptions data in addition to other data generated from the profile of the exceptions data. The monitoring system can generate a statistical summary of the exceptions data and generate on or more reports including the summary. Generating a profile can include generating summary data representing the exceptions. The summary generally includes a representation of the exceptions without including all the data of the application exceptions.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, monitoring system 102 and the client devices 112*a-n* can be implemented using digital electronic circuitry, or in computer software, firmware, or hardware, or in combinations of one or more of them. In another example, the process 800 can be implemented using digital electronic circuitry, or in computer software, firmware, or hardware, or in combinations of one or more of them.

Some implementations described in this specification (e.g., sampling window module 110, the exceptions data profile module 112, reporting module 114, etc.) can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. In some implementations, the sampling window module 110, the exceptions data profile module 112, and/or the reporting module 114 comprises a data processing apparatus as described herein. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 9:
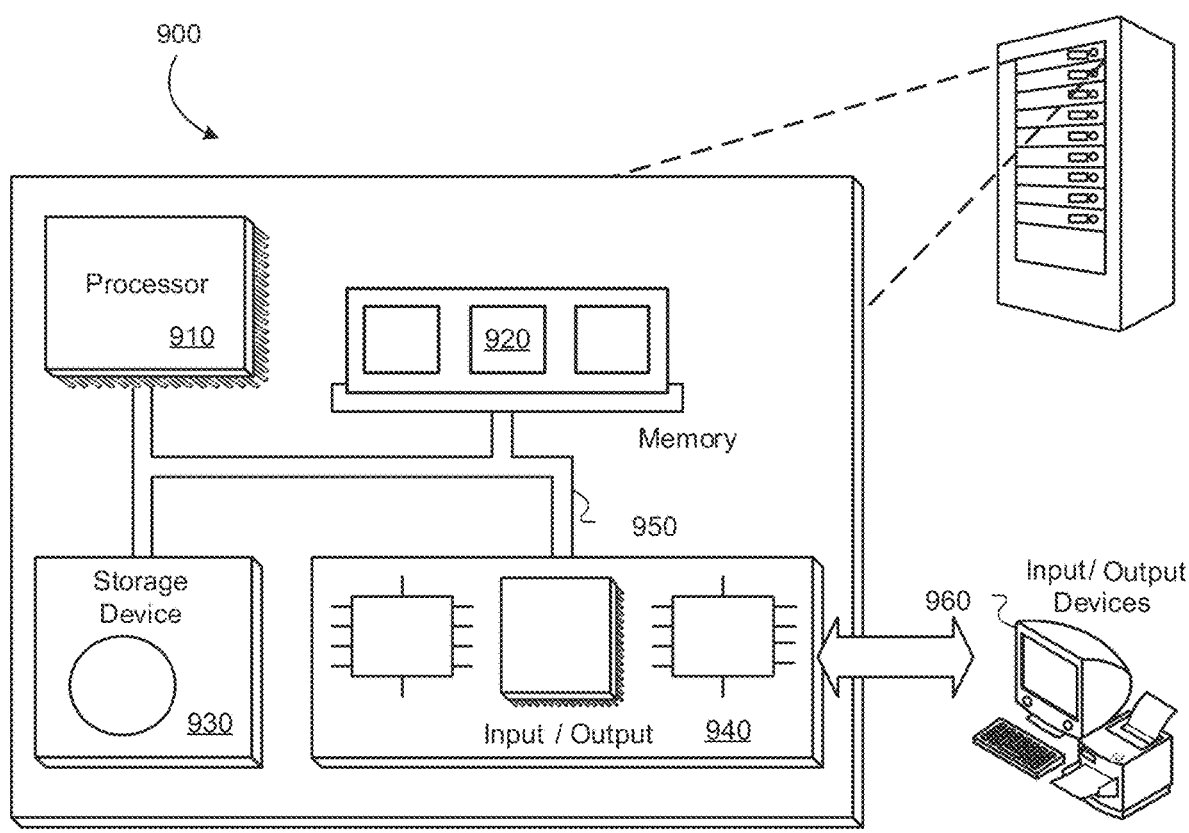
FIG. 9 is a diagram of an example computer system.

FIG. 9 shows an example computer system 900 that includes a processor 910, a memory 920, a storage device 930 and an input/output device 940. Each of the components 910, 920, 930 and 940 can be interconnected, for example, by a system bus 950. The processor 910 is capable of processing instructions for execution within the system 900. In some implementations, the processor 910 is a single-threaded processor, a multi-threaded processor, or another type of processor. The processor 910 is capable of processing instructions stored in the memory 920 or on the storage device 930. The memory 920 and the storage device 930 can store information within the system 900.

The input/output device 940 provides input/output operations for the system 900. In some implementations, the input/output device 940 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 960. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the data processing system described herein. Accordingly, other embodiments are within the scope of the following claims.

What is claimed is:

1. A method for monitoring a performance of one or more computing systems, the method comprising:
    configuring, by at least one processor, a sampling window for sampling exceptions data generated by at least one application instance being executed by a computing device, the exceptions data indicating an occurrence of at least one operation performed by the application instance, wherein configuring the sampling window comprises:
        determining a number of exceptions generated for a prior sampling window,
        determining a computing bandwidth that is available for monitoring the exceptions for the sampling window, and
        controlling a sampling rate of the sampling window based on the number of exceptions and the computing bandwidth that is available for monitoring the exceptions for the sampling window;
    receiving, during the sampling window, the exceptions data generated by the at least one application instance;
    sampling, based on controlling the sampling rate, the exceptions data as the exceptions data are received, wherein the sampling consumes a computing bandwidth that is less than or equal to the computing bandwidth that is available for monitoring the exceptions for the sampling window; and
    generating, based on the sampling, summary data representing the exceptions data.

2. The method of claim 1, wherein controlling the sampling rate further comprises:
    determining a moving average of the number of exceptions generated for the prior sampling window and one or more additional prior sampling windows; and
    controlling the sampling rate for the sampling window based on the moving average.

3. The method of claim 1, wherein determining the computing bandwidth available comprises setting an absolute threshold for a data production rate for performance monitoring.

4. The method of claim 1, wherein determining the computing bandwidth available comprises setting a percentage threshold for a data production rate for performance monitoring, the percentage being a portion of a total available computing bandwidth.

5. The method of claim 1, wherein controlling the sampling rate of the sampling window causes a data production rate, of producing the summary data, that is within a threshold range of a target production rate of producing the summary data.

6. The method of claim 1, further comprising:
determining, during the sampling window, that the computing bandwidth that is available for monitoring the exceptions is prematurely exceeded for the sampling window;
storing, in a data store, sampled exceptions that are sampled after the available computing bandwidth is exceeded; and
processing the sampled exceptions that are stored in the data store once additional computing bandwidth is available.

7. The method of claim 1, wherein the summary data comprises at least one full stack trace for each type of sampled exception of the exceptions data.

8. The method of claim 1, wherein the summary data comprises metadata associated with the sampled exceptions data, the metadata including at least one of:
a type of each sampled exception, a time that each exception is generated, an identifier indicating an instance of the application that generated the exception, and a count value associated with the exception.

9. The method of claim 1, wherein a size of the sampling window is identical to the prior sampling window, and wherein the size of the sampling window is static.

10. A system for monitoring a performance of one or more computing systems, the system comprising:
at least one processor; and
a memory storing instructions that, when executed by the at least one processor, cause the at least one processor to perform operations comprising:
configuring a sampling window for sampling exceptions data generated by at least one application instance being executed by a computing device, the exceptions data indicating an occurrence of at least one operation performed by the application instance, wherein configuring the sampling window comprises:
determining a number of exceptions generated for a prior sampling window,
determining a computing bandwidth that is available for monitoring the exceptions for the sampling window, and
controlling a sampling rate of the sampling window based on the number of exceptions and the computing bandwidth that is available for monitoring the exceptions for the sampling window;
receiving, during the sampling window, the exceptions data generated by the at least one application instance;
sampling, based on controlling the sampling rate, the exceptions data as the exceptions data are received, wherein the sampling consumes a computing bandwidth that is less than or equal to the computing bandwidth that is available for monitoring the exceptions for the sampling window; and
generating, based on the sampling, summary data representing the exceptions data.

11. The system of claim 10, wherein controlling the sampling rate further comprises:
determining a moving average of the number of exceptions generated for the prior sampling window and one or more additional prior sampling windows; and
controlling the sampling rate for the sampling window based on the moving average.

12. The system of claim 10, wherein determining the computing bandwidth available comprises setting an absolute threshold for a data production rate for performance monitoring.

13. The system of claim 10, wherein determining the computing bandwidth available comprises setting a percentage threshold for a data production rate for performance monitoring, the percentage being a portion of a total available computing bandwidth.

14. The system of claim 10, wherein controlling the sampling rate of the sampling window causes a data production rate, of producing the summary data, that is within a threshold range of a target production rate of producing the summary data.

15. The system of claim 10, the operations further comprising:
determining, during the sampling window, that the computing bandwidth that is available for monitoring the exceptions is prematurely exceeded for the sampling window;
storing, in a data store, sampled exceptions that are sampled after the available computing bandwidth is exceeded; and
processing the sampled exceptions that are stored in the data store once additional computing bandwidth is available.

16. The system of claim 10, wherein the summary data comprises at least one full stack trace for each type of sampled exception of the exceptions data.

17. The system of claim 10, wherein the summary data comprises metadata associated with the sampled exceptions data, the metadata including at least one of:
a type of each sampled exception, a time that each exception is generated, an identifier indicating an instance of the application that generated the exception, and a count value associated with the exception.

18. The system of claim 10, wherein a size the sampling window is identical to the prior sampling window, and wherein the size of the sampling window is static.

19. One or more on-transitory computer readable media storing instructions for monitoring a performance of one or more computing systems, the instructions causing, when executed by at least one processor, the at least one processor to perform operations comprising:
configuring a sampling window for sampling exceptions data generated by at least one application instance being executed by a computing device, the exceptions data indicating an occurrence of at least one operation performed by the application instance, wherein configuring the sampling window comprises:
determining a number of exceptions generated for a prior sampling window,
determining a computing bandwidth that is available for monitoring the exceptions for the sampling window, and
controlling a sampling rate of the sampling window based on the number of exceptions and the computing bandwidth that is available for monitoring the exceptions for the sampling window;
receiving, during the sampling window, the exceptions data generated by the at least one application instance;
sampling, based on controlling the sampling rate, the exceptions data as the exceptions data are received, wherein the sampling consumes a computing bandwidth that is less than or equal to the computing bandwidth that is available for monitoring the exceptions for the sampling window; and generating, based on the sampling, summary data representing the exceptions data.

20. The one or more on-transitory computer readable media of claim 19, the operations further comprising:
- determining, during the sampling window, that the computing bandwidth that is available for monitoring the exceptions is prematurely exceeded for the sampling window;
- storing, in a data store, sampled exceptions that are sampled after the available computing bandwidth is exceeded; and
- processing the sampled exceptions that are stored in the data store once additional computing bandwidth is available.

* * * * *

UNITED STATES PATENT AND TRADEMARK OFFICE
CERTIFICATE OF CORRECTION

| | | |
|---|---|---|
| PATENT NO. | : 11,620,206 B2 | Page 1 of 1 |
| APPLICATION NO. | : 17/238036 | |
| DATED | : April 4, 2023 | |
| INVENTOR(S) | : Jaroslav Bachorik, Marcus Hirt and Nikolay Martynov | |

It is certified that error appears in the above-identified patent and that said Letters Patent is hereby corrected as shown below:

In the Claims

Column 20, Line 37, Claim 18:
After "size" insert -- of --.

Column 20, Line 40, Claim 19:
Delete "on-transitory" and insert -- non-transitory --.

Column 21, Line 3, Claim 20:
Delete "on-transitory" and insert -- non-transitory --.

Signed and Sealed this
Twenty-third Day of May, 2023

*Katherine Kelly Vidal*

Katherine Kelly Vidal
*Director of the United States Patent and Trademark Office*